(12) United States Patent
Tian (10) Patent No.: US 11,381,503 B2
(45) Date of Patent: Jul. 5, 2022

(54) DATA PACKET ROUTING METHOD AND DATA PACKET ROUTING DEVICE

(71) Applicant: ZTE CORPORATION, Guangdong (CN)

(72) Inventor: Shixin Tian, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 204 days.

(21) Appl. No.: 16/631,467

(22) PCT Filed: Apr. 13, 2018

(86) PCT No.: PCT/CN2018/082956
§ 371 (c)(1),
(2) Date: Jan. 16, 2020

(87) PCT Pub. No.: WO2019/015363
PCT Pub. Date: Jan. 24, 2019

(65) Prior Publication Data
US 2020/0186469 A1 Jun. 11, 2020

(30) Foreign Application Priority Data
Jul. 20, 2017 (CN) .......................... 201710595398.1

(51) Int. Cl.
*H04L 45/745* (2022.01)
*H04L 45/741* (2022.01)
(Continued)

(52) U.S. Cl.
CPC ............ *H04L 45/745* (2013.01); *H04L 45/22* (2013.01); *H04L 45/42* (2013.01); *H04L 45/566* (2013.01);
(Continued)

(58) Field of Classification Search
CPC ....... H04L 45/745; H04L 45/22; H04L 45/42; H04L 45/566; H04L 45/741; H04L 61/1511; H04L 69/22
See application file for complete search history.

(56) References Cited

U.S. PATENT DOCUMENTS 10,015,094 B1 * 7/2018 Akers ................ H04L 61/6068
10,033,691 B1 * 7/2018 Mizik .................. H04L 49/354
(Continued)

FOREIGN PATENT DOCUMENTS

CN 102282801 A 12/2011
CN 102970387 A 3/2013
(Continued)

OTHER PUBLICATIONS

WIPO, International Search Report dated Jun. 12, 2018.
(Continued)

*Primary Examiner* — Kent Krueger
(74) *Attorney, Agent, or Firm* — Cantor Colburn LLP (57) ABSTRACT

The present disclosure provides a data packet routing method and a data packet routing device. The data packet routing method includes receiving and resolving an initial route resolution request message to obtain a requested domain name in the initial route resolution request message;
(Continued)

determining whether there is a specified domain name resolution server corresponding to the requested domain name; if there is a specified domain name resolution server corresponding to the requested domain name, modifying a default destination address of the initial route resolution request message to an address of the specified domain name resolution server, so as to obtain a routing information request message; searching for routing information corresponding to the routing information request message; and sending a data packet to a destination address corresponding to the requested domain name.

11 Claims, 4 Drawing Sheets

(51) Int. Cl.
*H04L 45/00* (2022.01)
*H04L 45/42* (2022.01)
*H04L 61/4511* (2022.01)
*H04L 69/22* (2022.01)

(52) U.S. Cl.
CPC ........ *H04L 45/741* (2013.01); *H04L 61/1511* (2013.01); *H04L 69/22* (2013.01)

(56) References Cited

U.S. PATENT DOCUMENTS

| | | |
|---|---|---|
| 2003/0154306 A1 | 8/2003 | Perry |
| 2010/0186079 A1 | 7/2010 | Nice et al. |
| 2011/0002339 A1* | 1/2011 | Fok .................. H04L 63/0236 370/401 |
| 2018/0139224 A1* | 5/2018 | Arnell .................. H04L 41/12 |

FOREIGN PATENT DOCUMENTS

| | | |
|---|---|---|
| CN | 103002069 A | 3/2013 |
| CN | 103634214 A | 3/2014 |
| CN | 104767690 A | 7/2015 |
| CN | 105577843 A | 5/2016 |
| CN | 105897947 A | 8/2016 |
| CN | 106549944 A | 3/2017 |
| WO | 2017039602 A1 | 3/2017 |

OTHER PUBLICATIONS

European Patent Office, The extended European search report dated Feb. 4, 2021 for application No. EP18834470.9.
China Patent Office, First Office Action dated Jul. 2, 2021 for application No. CN201710595398.1.

* cited by examiner

DATA PACKET ROUTING METHOD AND DATA PACKET ROUTING DEVICE

CROSS-REFERENCE TO RELATED APPLICATIONS

This is a National Phase Application filed under 35 U.S.C. 371 as a national stage of PCT/CN2018/082956, filed on Apr. 13, 2018, an application claiming the priority of Chinese Patent Application No. 201710595398.1, filed on Jul. 20, 2017, the contents of which are incorporated herein in their entirety by reference.

TECHNICAL FIELD

The present disclosure relates to IP data packets, and in particular, to a data packet routing method and a data packet routing device.

BACKGROUND

In the processes that a user uses data services to perform various internet applications, the networks which the user needs to access include a Public Data Net and a Private Data Net, wherein the Private Data Net has higher requirements on security and real-time performance of accessed data packets. However, in conventional data packet routing policy, when a user inputs a domain name for access, all domain names are resolved by a default domain name resolution server, in such a case, the data packets for the user to access a Private Data Net and the data packets for the user to access a Public Data Net cannot be effectively isolated, so that neither the security nor the real-time performance of data can be well guaranteed.

SUMMARY

The present disclosure provides a data packet routing method, including: receiving and resolving an initial route resolution request message to obtain a requested domain name in the initial route resolution request message; determining whether there is a specified domain name resolution server corresponding to the requested domain name according to preset domain name configuration information and the requested domain name, wherein the preset domain name configuration information includes a correspondence between a domain name, a specified domain name resolution server and an address of the specified domain name resolution server; if there is a specified domain name resolution server corresponding to the requested domain name, modifying a default destination address of the initial route resolution request message to an address of the specified domain name resolution server, so as to obtain a routing information request message; searching for routing information corresponding to the routing information request message according to the routing information request message and preset routing information, wherein the preset routing information includes a correspondence between mark information and routing information; and sending a data packet to a destination address corresponding to the requested domain name according to the routing information.

The present disclosure further provides a data packet routing device, including: a route resolution request message acquiring module configured to receive and resolve an initial route resolution request message to obtain a requested domain name in the initial route resolution request message; a specified domain name resolution server acquiring module configured to determine whether there is a specified domain name resolution server corresponding to the requested domain name according to preset domain name configuration information and the requested domain name, wherein the preset domain name configuration information includes a correspondence between a domain name, a specified domain name resolution server and an address of the specified domain name resolution server; a routing information request message acquiring module configured to modify a default destination address of the initial route resolution request message to an address of the specified domain name resolution server if there is a specified domain name resolution server corresponding to the requested domain name, so as to obtain a routing information request message; a routing information acquiring module configured to search for routing information corresponding to the routing information request message according to the routing information request message and preset routing information, wherein the preset routing information includes a correspondence between mark information and routing information; and a sending module configured to send a data packet to a destination address corresponding to the requested domain name according to the routing information.

The present disclosure further provides a computer-readable storage medium storing computer programs which, when executed by a processor, cause the processor to perform the data packet routing method of the present disclosure.

The above description is only a summary of various aspects of the present disclosure. In order to facilitate clear understanding of the technical solutions of the present disclosure, and make the above and other objects, features, and advantages of the present disclosure more obvious and easy to be understood, specific implementations of the present disclosure will be described below in conjunction with the accompanying drawings.

BRIEF DESCRIPTION OF THE DRAWINGS

Various other advantages and benefits will become apparent to those skilled in the art upon reading the following detailed description. The drawings are only for purposes of illustrating embodiments and are not intended to limit the present disclosure. In the drawings, the same reference symbols are used to indicate the same elements. In the drawings.

DETAILED DESCRIPTION

Exemplary embodiments of the present disclosure will be described in detail below with reference to the accompanying drawings. While various exemplary embodiments are shown in the drawings, it should be understood that the present disclosure may be implemented in various forms and should not be limited to the embodiments shown herein. The following embodiments are provided for enabling thorough understanding of the present disclosure, and full conveying of the protection scope of the present disclosure to those skilled in the art.

Figure 1:
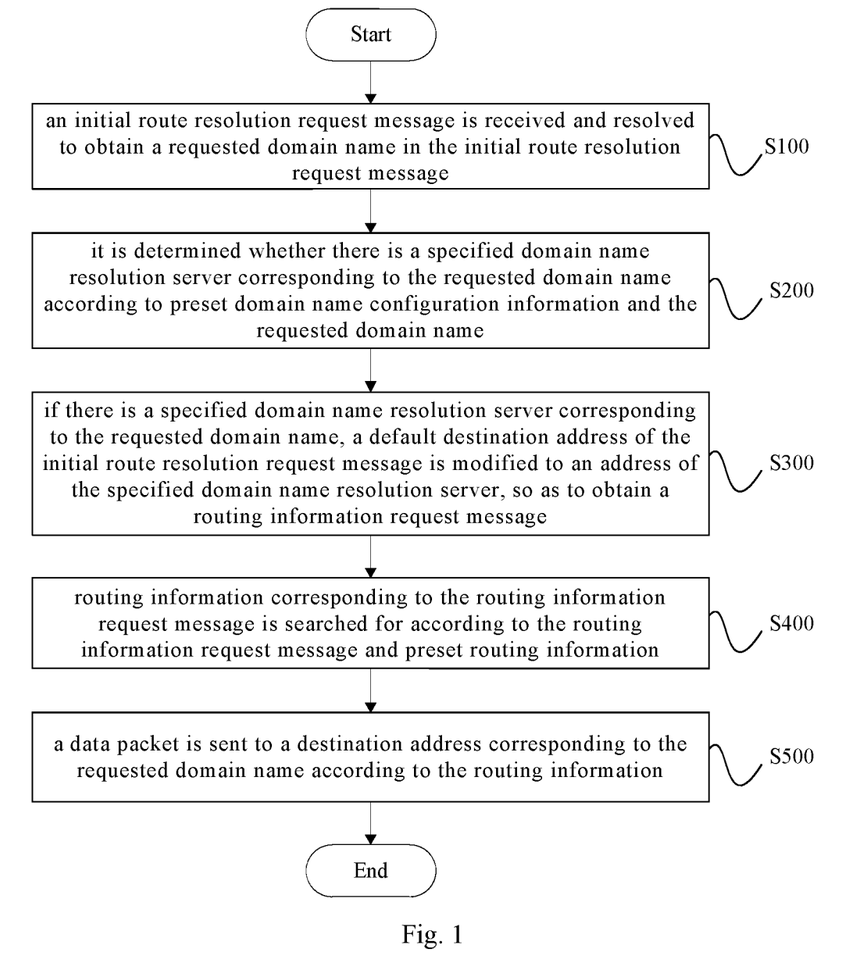
FIG. 1 is a flowchart illustrating a data packet routing method according to an embodiment of the present disclosure.

FIG. 1 is a flowchart illustrating a data packet routing method according to an embodiment of the present disclosure. The data packet routing method shown in FIG. 1 includes the following steps S100-S500.

In Step S100, an initial route resolution request message is received and resolved to obtain a requested domain name in the initial route resolution request message.

In one embodiment, the obtained requested domain name is a domain name of a website that a user needs to access. The website includes a Public Data Net or a Private Data Net. The Public Data Net is a network open to all internet users, and the users can access the internet through the Public Data Net, while the Private Data Net is a data networks dedicated to a certain vendor.

In Step S200, it is determined whether there is a specified domain name resolution server corresponding to the requested domain name according to preset domain name configuration information and the requested domain name. The preset domain name configuration information may include a correspondence between a domain name, a specified domain name resolution server and an address of the specified domain name resolution server.

In one embodiment, the preset domain name configuration information may include, for example, a dnsmasq.conf file. Domain names which need to be resolved by the specified domain name resolution server are preset in the dnsmasq.conf file. In practical applications, information in the dnsmasq.conf file may be preset as required by using a blacklist or a whitelist. In a case that a whitelist is used, if the requested domain name is included in the dnsmasq.conf file, the requested domain name needs to be resolved by the specified domain name resolution server.

In an exemplary embodiment, taking a Domain Name System (DNS) server 10.10.10.21 and a Content Security Policy (CSP) server 10.22.22.31 (domain: car.csp_test.com) for a Private Data Net as an example, if the domain name of car.csp_test.com of the CSP server is to be assigned to the DNS server for domain name resolution, the following configuration line needs to be added to the dnsmasq.conf file:

server=/car.csp_test.com/10.10.10.21;

wherein car.csp_test.com is the domain name of the CSP server of the Private Data Net, and 10.10.10.21 is an IP address of the DNS server in the Private Data Net.

In Step S300, if there is a specified domain name resolution server corresponding to the requested domain name, a default destination address of the initial route resolution request message is modified to an address of the specified domain name resolution server, so as to obtain a routing information request message.

In one embodiment, if there is a specified domain name resolution server corresponding to the requested domain name in the dnsmasq.conf file, the requested domain name needs to be resolved by the specified domain name resolution server, and so the default destination address is modified to the address of the specified domain name resolution server to obtain the routing information request message.

In one embodiment, after the default destination address is modified to the address of the specified domain name resolution server, the initial route resolution request message is sent to the address of the specified domain name resolution server, so as to obtain the routing information request message from the specified domain name resolution server, wherein the routing information request message may include an IP address corresponding to the requested domain name.

In one embodiment, if there is no specified domain name resolution server corresponding to the requested domain name, the initial route resolution request message is sent to the default destination address, so as to obtain the routing information request message, wherein the routing information request message may include an IP address corresponding to the requested domain name.

In Step S400, routing information corresponding to the routing information request message is searched for according to the routing information request message and preset routing information. The preset routing information includes a correspondence between mark information and routing information.

In one embodiment, according to information (for example, an IP address corresponding to the requested domain name) included in the routing information request message, the preset routing information is searched for the routing information corresponding to the routing information request message.

In Step S500, a data packet is sent to a destination address corresponding to the requested domain name according to the routing information.

In one embodiment, the data packet is sent according to the found routing information so as to send the data packet to the destination address corresponding to the requested domain name. In one embodiment, the destination address corresponding to the requested domain name may be an IP address of a server of a network corresponding to the requested domain name.

In the above data packet routing method provided according to the embodiment of the present disclosure, after an initial route resolution request message received is resolved to obtain a requested domain name requested to be accessed by a user, preset domain name configuration information is searched to determine whether there is a specified domain name resolution server corresponding to the requested domain name, and if so, a default destination address of the initial route resolution request message is modified to an address of the specified domain name resolution server to obtain a routing information request message, and then routing information corresponding to the routing information request message is searched for according to preset routing information and a data packet is sent according to the routing information. It can be seen that, in the above data packet routing method, the data packet sent to a specific domain name is resolved by a specified domain name resolution server and is sent according to the routing information obtained from the preset routing information, so that data packets of a user for accessing the Public Data Net are isolated from data packets of the user for accessing the Private Data Net, and security and real-time performance of data packet transmission are improved.

Figure 2:
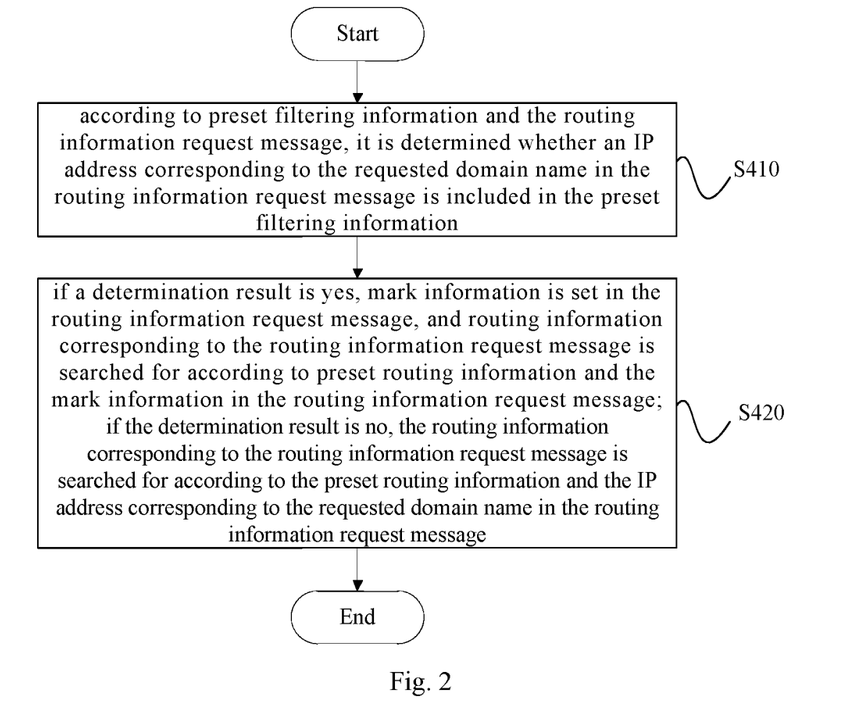
FIG. 2 is a flowchart illustrating a data packet routing method according to another embodiment of the present disclosure.

FIG. 2 is a flowchart illustrating a data packet routing method according to another embodiment of the present disclosure. The data packet routing method as shown in FIG. 2 includes the following steps S410-S420.

In Step S410, according to preset filtering information and the routing information request message, it is determined whether an IP address corresponding to the requested domain name in the routing information request message is included in the preset filtering information. The preset filtering information includes a correspondence between an IP address corresponding to a domain name in the preset domain name configuration information and mark information.

In one embodiment, the preset filtering information may include, for example, an iptables table. In one embodiment, the iptables table is first processed, for example, as follows:

iptables -A POSTROUTING -t nat -o rmnet_data1 -j MASQUERADE

The above processing is to perform Network Address Translation (NAT) on internal and external network addresses in the iptables table, wherein rmnet_data1 is a network interface of a Private Data Net.

Next, it may be determined whether it is necessary to set mark information in the routing information request message based on a determination result.

In Step S420, if the determination result is yes, mark information is set in the routing information request message, and routing information corresponding to the routing information request message is searched for according to preset routing information and the mark information in the routing information request message; and if the determination result is no, the routing information corresponding to the routing information request message is searched for according to the preset routing information and the IP address corresponding to the requested domain name in the routing information request message.

The mark information includes tags commonly used in actual use, wherein the tag includes one or any combination of numbers and letters. The mark information may be used for selecting the routing information. In one embodiment, it is possible to set mark information for all specified domain name resolution servers, and it is also possible to set mark information for some specified domain name resolution servers, so as to meet different usage requirements. The added mark information is, for example:

iptables -A POSTROUTING -t mangle -m iprange --dst-range 10.10.10.20-10.22.22.31 -j MARK --set-mark3 where mark 3 is the mark information.

The routing information is path information to a specific network terminal, and may include one or more routing tables. In the embodiment of the present disclosure, the routing table may be associated with the mark information, so as to allow the routing information request message having the mark information to reach a destination address according to a specified path. For example, searching for the routing information corresponding to the routing information request message may be implemented through the following code: ip rule add fwmark 3 table 3, that is, the routing information corresponding to the routing information request message having tag 3 follows table 3.

Then, a data packet is sent to a destination address corresponding to the requested domain name according to the found routing information, which may be implemented, for example, through the following code: ip route add table 3 via 10.22.22.2 dev rmnet_data1, that is, a data packet following table 3 is transmitted through rmnet_data 1.

In the above data packet routing method provided according to the embodiment of the present disclosure, after an initial route resolution request message received is resolved to obtain a requested domain name requested to be accessed by a user, preset domain name configuration information is searched to determine whether there is a specified domain name resolution server corresponding to the requested domain name, and if so, a default destination address of the initial route resolution request message is modified to an address of the specified domain name resolution server to obtain a routing information request message, then mark information is set in the routing information request message according to preset filtering information, and finally routing information corresponding to the routing information request message is searched for according to preset routing information and a data packet is sent according to the routing information. It can be seen that, in the above data packet routing method, the data packet sent to a specific domain name is resolved by a specified domain name resolution server, is determined whether to be marked or not according to the filtering information, and then is sent according to the routing information obtained from the preset routing information based on whether the data packet is marked or not, so that data packets of a user for accessing the Public Data Net are isolated from data packets of the user for accessing the Private Data Net, and security and real-time performance of data packet transmission are improved.

In each of the above embodiments, the requested domain name may include domain name subject information of the requested domain name, and therefore, the step of determining whether there is a specified domain name resolution server corresponding to the requested domain name according to preset domain name configuration information and the requested domain name may include: determining whether there is a specified domain name resolution server corresponding to the domain name subject information according to the preset domain name configuration information and the domain name subject information.

In one embodiment, it may be supported to subsequently query domain name resolution server configuration according to the domain name subject information of the requested domain name, and it is possible to query according to the whole domain name subject information or part of the domain name subject information. For example, when a user accesses "www.sina.com.", it is supported to query according to "sina" as well as any one of "si", "sin", and "ina".

In the above embodiment, with the support of query according to the domain name subject information, the domain name can be easily assigned to a specified domain name resolution server through simple settings in, for example, a dnsmasq.conf file, so as to achieve isolation of data packets when a user accesses a specific website.

In each of the above embodiments, the requested domain name includes domain name suffix information of the requested domain name, and therefore, the step of determining whether there is a specified domain name resolution server corresponding to the requested domain name according to preset domain name configuration information and the requested domain name may include: determining whether there is a specified domain name resolution server corresponding to the domain name suffix information according to the preset domain name configuration information and the domain name suffix information.

In one embodiment, it may be supported to subsequently query domain name resolution server configuration according to the domain name suffix information of the requested domain name. For example, when a user accesses "www.sina.com.", it is supported to query according to "com".

In the above embodiment, with the support of query according to the domain name suffix information, the domain name can be easily assigned to a specified domain name resolution server through simple settings in, for example, a dnsmasq.conf file, so as to achieve isolation of data packets when a user accesses a specific website.

In each of the above embodiments, the requested domain name may include a source address of the initial route resolution request message, and therefore, the step of determining whether there is a specified domain name resolution server corresponding to the requested domain name according to preset domain name configuration information and the requested domain name may include: determining whether there is a specified domain name resolution server corresponding to the source address of the initial route resolution request message according to the preset domain name configuration information and the source address of the initial route resolution request message.

In one embodiment, it may be supported to subsequently query domain name resolution server configuration according to the source address of the initial route resolution request message of the requested domain name. For example, when a user accesses "www.sina.com.", it is supported to query according to the source address of the initial route resolution request message, and the initial route resolution request messages from a particular source may be configured to be resolved by a specified domain name resolution server.

In the above embodiment, with the support of query according to the source address of the initial route resolution request message, the domain name can be easily assigned to a specified domain name resolution server through simple settings in, for example, a dnsmasq.conf file, so as to achieve isolation of data packets when a user accesses a specific website.

Figure 3:
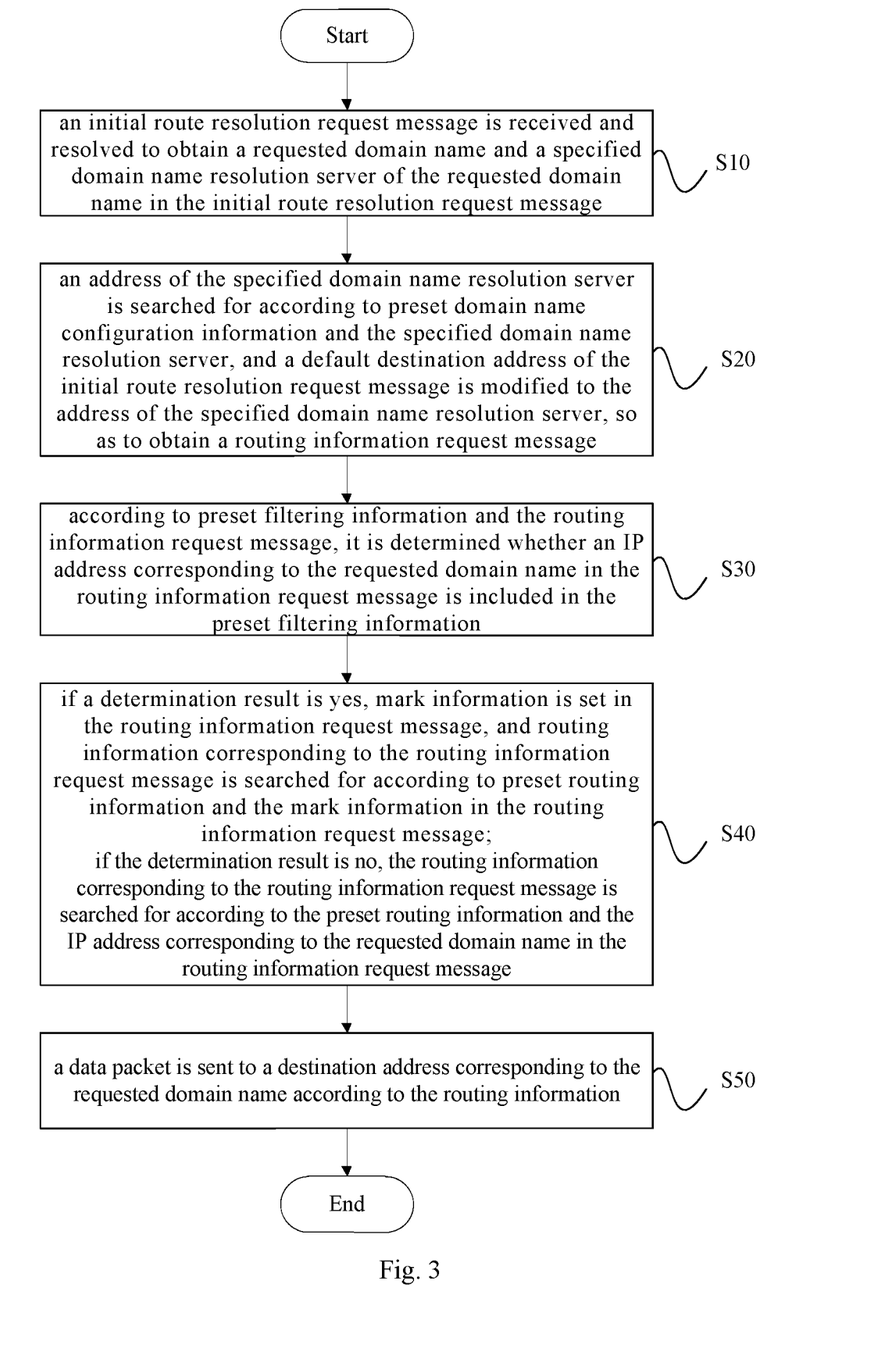
FIG. 3 is a flowchart illustrating a data packet routing method according to yet another embodiment of the present disclosure.

FIG. 3 is a flowchart illustrating a data packet routing method according to yet another embodiment of the present disclosure. The data packet routing method as shown in FIG. 3 includes the following steps S10-S50.

In Step S10, an initial route resolution request message is received and resolved to obtain a requested domain name and a specified domain name resolution server of the requested domain name in the initial route resolution request message.

In one embodiment, the received initial route resolution request message may carry a specified domain name resolution server. In one embodiment, the specified domain name resolution server may be specified by a user or be specified automatically by an application program.

In Step S20, an address of the specified domain name resolution server is searched for according to preset domain name configuration information and the specified domain name resolution server, and a default destination address of the initial route resolution request message is modified to the address of the specified domain name resolution server, so as to obtain a routing information request message. The preset domain name configuration information includes a correspondence between a domain name, a specified domain name resolution server and an address of the specified domain name resolution server.

In one embodiment, if a specified domain name resolution server of the requested domain name is received in the initial route resolution request message, the address of the specified domain name resolution server is directly queried in the domain name configuration information, and then the default destination address of the initial route resolution request message is modified to the address of the specified domain name resolution server to obtain the routing information request message.

The detailed implementations of modifying the default destination address of the initial route resolution request message to the address of the specified domain name resolution server to obtain the routing information request message in Step S20 may refer to the Step S300 in the above embodiments.

In Step S30, according to preset filtering information and the routing information request message, it is determined whether an IP address corresponding to the requested domain name in the routing information request message is included in the preset filtering information, and if a determination result is yes, mark information is set in the routing information request message, and if the determination result is no, routing information corresponding to the routing information request message is searched for according to the preset routing information and the IP address corresponding to the requested domain name in the routing information request message. The preset filtering information includes a correspondence between an IP address corresponding to a domain name in the preset domain name configuration information and mark information.

In Step S40, the routing information corresponding to the routing information request message is searched for according to the preset routing information and the routing information request message. The preset routing information includes a correspondence between the mark information and the routing information.

The detailed implementations of the Steps S30-S40 may refer to the Steps S410-S420 in the above embodiments.

In Step S50, a data packet is sent to a destination address corresponding to the requested domain name according to the routing information.

The detailed implementation of the Step S50 may refer to the Step S500 in the above embodiment.

In the above data packet routing method provided according to the embodiment of the present disclosure, the received domain name resolution request message carries a specified domain name resolution server, an address of the specified domain name resolution server is searched for in preset domain name configuration information, a default destination address of the initial route resolution request message is modified to the address of the specified domain name resolution server to obtain a routing information request message, then mark information is set in the routing information request message according to preset filtering information, and finally routing information corresponding to the routing information request message is searched for according to preset routing information and a data packet is sent according to the routing information. It can be seen that, in the above data packet routing method, it is supported to query about an address according to the specified domain name resolution server, so that the data packet sent to a specific domain name is resolved by the specified domain name resolution server, is determined whether to be marked or not according to the filtering information, and then is sent according to the routing information obtained from the preset routing information based on whether the data packet is marked or not. Therefore, data packets of a user for accessing the Public Data Net are isolated from data packets of the user for accessing the Private Data Net, and security and real-time performance of data packet transmission are improved.

Figure 4:
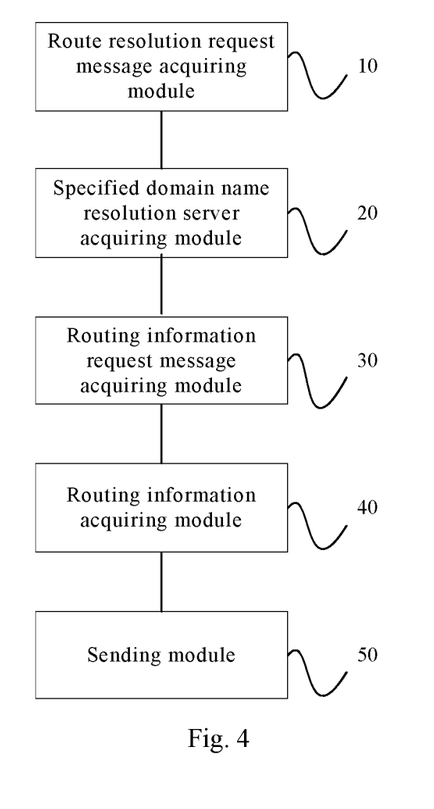
FIG. 4 is a schematic structural diagram of a data packet routing device according to an embodiment of the present disclosure.

FIG. 4 is a schematic structural diagram of a data packet routing device according to an embodiment of the present disclosure. The data packet routing device shown in FIG. 4 includes a route resolution request message acquiring module 10, a specified domain name resolution server acquiring module 20, a routing information request message acquiring module 30, a routing information acquiring module 40, and a sending module 50.

The route resolution request message acquiring module 10 may be configured to receive and resolve an initial route resolution request message to obtain a requested domain name in the initial route resolution request message, and may be further configured to obtain a specified domain name resolution server of the requested domain name. In some embodiments, the requested domain name may include domain name subject information or domain name suffix information of the requested domain name; and in some other embodiments, the requested domain name may include a source address of the initial route resolution request message.

The specified domain name resolution server acquiring module 20 may be configured to determine whether there is a specified domain name resolution server corresponding to the requested domain name according to preset domain name configuration information and the requested domain name. The preset domain name configuration information includes a correspondence between a domain name, a specified domain name resolution server and an address of the specified domain name resolution server. The specified domain name resolution server acquiring module 20 may be further configured to search for an address of the specified domain name resolution server according to the preset domain name configuration information and the specified domain name resolution server. The specified domain name resolution server acquiring module 20 may be further configured to determine whether there is a specified domain name resolution server corresponding to the domain name subject information or the domain name suffix information according to the preset domain name configuration information and the domain name subject information or according to the preset domain name configuration information and the domain name suffix information, and determine whether there is a specified domain name resolution server corresponding to the source address of the initial route resolution request message according to the preset domain name configuration information and the source address of the initial route resolution request message.

The routing information request message acquiring module 30 may be configured to modify a default destination address of the initial route resolution request message to an address of the specified domain name resolution server if there is a specified domain name resolution server corresponding to the requested domain name, so as to obtain a routing information request message. The routing information request message acquiring module 30 may be further configured to, after the routing information request message acquiring module 30 modifies the default destination address to the address of the specified domain name resolution server, send the initial route resolution request message to the address of the specified domain name resolution server, so as to obtain the routing information request message from the specified domain name resolution server. The routing information request message acquiring module 30 may be further configured to, if there is no specified domain name resolution server corresponding to the requested domain name, send the initial route resolution request message to the default destination address, so as to obtain the routing information request message. The routing information request message may include an IP address corresponding to the requested domain name.

The routing information acquiring module 40 may be configured to search for routing information corresponding to the routing information request message according to the routing information request message and preset routing information. The preset routing information may include a correspondence between mark information and routing information. The routing information acquiring module 40 may include a mark information acquisition unit and a routing information acquisition unit (not shown). The mark information acquisition unit may be configured to determine whether the IP address corresponding to the requested domain name in the routing information request message is included in preset filtering information according to the preset filtering information and the routing information request message, and if a determination result is yes, set mark information in the routing information request message, and if the determination result is no, search for the routing information corresponding to the routing information request message according to the preset routing information and the IP address corresponding to the requested domain name in the routing information request message. The preset filtering information may include a correspondence between an IP address corresponding to a domain name in the preset domain name configuration information and mark information. The routing information acquisition unit may be configured to search for the routing information corresponding to the routing information request message according to the preset routing information and the mark information in the routing information request message.

The sending module 50 may be configured to send a data packet to a destination address corresponding to the requested domain name according to the routing information.

In the above data packet routing device provided in the embodiments of the present disclosure, after an initial route resolution request message received is resolved to obtain a requested domain name requested to be accessed by a user, preset domain name configuration information is searched to determine whether there is a specified domain name resolution server corresponding to the requested domain name, and if so, a default destination address of the initial route resolution request message is modified to an address of the specified domain name resolution server to obtain a routing information request message, then mark information is set in the routing information request message according to preset filtering information, and finally routing information corresponding to the routing information request message is searched for according to preset routing information and a data packet is sent according to the routing information. It can be seen that, in the above data packet routing device, the data packet sent to a specific domain name is resolved by a specified domain name resolution server, is determined whether to be marked or not according to the filtering information, and then is sent according to the routing information obtained from the preset routing information based on whether the data packet is marked or not, so that data packets of a user for accessing the Public Data Net are isolated from data packets of the user for accessing the Private Data Net, and security and real-time performance of data packet transmission are improved.

The present disclosure further provides a computer-readable storage medium with computer programs stored thereon, when the computer programs are executed by a processor, the processor performs the data packet routing methods according to the above embodiments.

It should be understood by those skilled in the art that all or part of the steps in the methods according to the above embodiments may be implemented by instructing relevant hardware with programs, and the programs may be stored in a computer-readable storage medium which may include a ROM, a RAM, a magnetic disk, an optical disk, etc.

In summary, the above embodiments are only exemplary embodiments of the present disclosure, and are not intended to limit the protection scope of the present disclosure. Various modifications, equivalent substitutions and improvements may be made by those skilled in the art without departing from the spirit and principles of the present disclosure.

What is claimed is:

1. A data packet routing method, comprising:
    receiving and resolving an initial route resolution request message to obtain a requested domain name in the initial route resolution request message;
    determining whether there is a specified domain name resolution server corresponding to the requested domain name according to preset domain name configuration information and the requested domain name, wherein the preset domain name configuration information comprises a correspondence between a domain name, a specified domain name resolution server and an address of the specified domain name resolution server;
    if there is the specified domain name resolution server corresponding to the requested domain name, modifying a default destination address of the initial route resolution request message to an address of the specified domain name resolution server, so as to obtain a routing information request message;
    searching for request routing information corresponding to the routing information request message according to the routing information request message and preset routing information, wherein the preset routing information comprises a correspondence between mark information and routing information; and
    sending a data packet to a destination address corresponding to the requested domain name according to the routing information;
    wherein the step of modifying the default destination address of the initial route resolution request message to the address of the specified domain name resolution server so as to obtain the routing information request message comprises:
        after the default destination address is modified to the address of the specified domain name resolution server, sending the initial route resolution request message to the address of the specified domain name resolution server, so as to obtain the routing information request message from the specified domain name resolution server, wherein the routing information request message comprises an IP address corresponding to the requested domain name;
    wherein the step of searching for the request routing information corresponding to the routing information request message according to the routing information request message and the preset routing information comprises:
        according to preset filtering information and the routing information request message, determining whether the IP address corresponding to the requested domain name in the routing information request message is included in the preset filtering information, wherein the preset filtering information comprises a correspondence between an IP address corresponding to a domain name in the preset domain name configuration information and mark information;
        if a determination result is yes, setting mark information in the routing information request message, and searching for the request routing information corresponding to the routing information request message according to the preset routing information and the mark information in the routing information request message; and
        if the determination result is no, searching for the request routing information corresponding to the routing information request message according to the preset routing information and the IP address corresponding to the requested domain name in the routing information request message.

2. The data packet routing method of claim 1, wherein the requested domain name comprises domain name subject information of the requested domain name or domain name suffix information of the requested domain name, and
    wherein the step of determining whether there is the specified domain name resolution server corresponding to the requested domain name according to the preset domain name configuration information and the requested domain name comprises:
        determining whether there is a specified domain name resolution server corresponding to the domain name subject information according to the preset domain name configuration information and the domain name subject information, or
        determining whether there is a specified domain name resolution server corresponding to the domain name suffix information according to the preset domain name configuration information and the domain name suffix information.

3. The data packet routing method of claim 1, wherein the step of obtaining the requested domain name in the initial route resolution request message comprises:
    obtaining the specified domain name resolution server corresponding to the requested domain name, and
    wherein before the step of modifying the default destination address of the initial route resolution request message to the address of the specified domain name resolution server so as to obtain the routing information request message, the data packet routing method further comprises:
    searching for the address of the specified domain name resolution server according to the preset domain name configuration information and the specified domain name resolution server.

4. The data packet routing method of claim 1, wherein the requested domain name comprises a source address of the initial route resolution request message, and wherein the step of determining whether there is the specified domain name resolution server corresponding to the requested domain name according to the preset domain name configuration information and the requested domain name comprises:
    determining whether there is a specified domain name resolution server corresponding to the source address of the initial route resolution request message according to the preset domain name configuration information and the source address of the initial route resolution request message.

5. The data packet routing method of claim 1, wherein if there is no specified domain name resolution server corresponding to the requested domain name, the initial route resolution request message is sent to the default destination address, so as to obtain the routing information request message, wherein the routing information request message comprises an IP address corresponding to the requested domain name.

6. A data packet routing device, comprising a processor and a storage device, wherein the storage device stores processor-executable programs, and the programs comprise:
- a route resolution request message acquiring module configured to receive and resolve an initial route resolution request message to obtain a requested domain name in the initial route resolution request message;
- a specified domain name resolution server acquiring module configured to determine whether there is a specified domain name resolution server corresponding to the requested domain name according to preset domain name configuration information and the requested domain name, wherein the preset domain name configuration information comprises a correspondence between a domain name, a specified domain name resolution server and an address of the specified domain name resolution server;
- a routing information request message acquiring module configured to modify a default destination address of the initial route resolution request message to an address of the specified domain name resolution server if there is the specified domain name resolution server corresponding to the requested domain name, so as to obtain a routing information request message;
- a routing information acquiring module configured to search for request routing information corresponding to the routing information request message according to the routing information request message and preset routing information, wherein the preset routing information comprises a correspondence between mark information and routing information; and
- a sending module configured to send a data packet to a destination address corresponding to the requested domain name according to the routing information;

wherein the routing information request message acquiring module is further configured to:

after the routing information request message acquiring module modifies the default destination address to the address of the specified domain name resolution server, send the initial route resolution request message to the address of the specified domain name resolution server, so as to obtain the routing information request message from the specified domain name resolution server, wherein the routing information request message comprises an IP address corresponding to the requested domain name; and wherein the routing information acquiring module comprises a mark information acquisition unit and a routing information acquisition unit, wherein the mark information acquisition unit is configured to determine whether the IP address corresponding to the requested domain name in the routing information request message is included in preset filtering information according to the preset filtering information and the routing information request message, and set mark information in the routing information request message if a determination result is yes, wherein the preset filtering information comprises a correspondence between an IP address corresponding to a domain name in the preset domain name configuration information and mark information, and the routing information acquisition unit is configured to when the mark information is set in the routing information request message, search for the request routing information corresponding to the routing information request message according to the preset routing information and the mark information in the routing information request message, when the mark information is not set in the routing information request message, search for the request routing information corresponding to the routing information request message according to the preset routing information and the IP address corresponding to the requested domain name in the routing information request message.

7. The data packet routing device of claim 6, wherein the requested domain name comprises domain name subject information of the requested domain name or domain name suffix information of the requested domain name, and
- wherein the specified domain name resolution server acquiring module is further configured to determine whether there is a specified domain name resolution server corresponding to the domain name subject information according to the preset domain name configuration information and the domain name subject information, or determine whether there is a specified domain name resolution server corresponding to the domain name suffix information according to the preset domain name configuration information and the domain name suffix information.

8. The data packet routing device of claim 6, wherein the route resolution request message acquiring module is further configured to,
- obtain the specified domain name resolution server corresponding to the requested domain name, and
- wherein the specified domain name resolution server acquiring module is further configured to search for the address of the specified domain name resolution server according to the preset domain name configuration information and the specified domain name resolution server.

9. The data packet routing device of claim 6, wherein the requested domain name comprises a source address of the initial route resolution request message, and wherein the specified domain name resolution server acquiring module is further configured to determine whether there is a specified domain name resolution server corresponding to the source address of the initial route resolution request message according to the preset domain name configuration information and the source address of the initial route resolution request message.

10. The data packet routing device of claim 6, wherein the routing information request message acquiring module is further configured to:
- if there is no specified domain name resolution server corresponding to the requested domain name, send the initial route resolution request message to the default destination address, so as to obtain the routing information request message, wherein the routing information request message comprises an IP address corresponding to the requested domain name.

11. A non-transitory computer-readable storage medium storing computer programs which, when executed by a processor, cause the processor to perform the data packet routing method of claim 1.

* * * * *